United States Patent [19]

Brock

[11] Patent Number: 4,683,495
[45] Date of Patent: Jul. 28, 1987

[54] CIRCUIT ARRANGEMENT FOR DISTINGUISHING BETWEEN THE TWO FIELDS IN A TELEVISION SIGNAL

[75] Inventor: Thorsten Brock, Buchholz, Fed. Rep. of Germany

[73] Assignee: U.S. Philips Corporation, New York, N.Y.

[21] Appl. No.: 800,890

[22] Filed: Nov. 22, 1985

[30] Foreign Application Priority Data

Dec. 1, 1984 [DE] Fed. Rep. of Germany ....... 3443925

[51] Int. Cl.⁴ .............................................. H04N 5/04
[52] U.S. Cl. .................... 358/148; 358/150; 358/153; 358/154; 307/517; 307/518; 328/109; 328/110; 377/20; 377/44
[58] Field of Search ............... 358/148, 149, 150, 152, 358/153, 154, 158; 377/20, 44; 307/517, 518; 328/109, 110

[56] References Cited

U.S. PATENT DOCUMENTS 3,382,320 5/1968 Baldwin et al. ..................... 358/152
4,169,659 10/1979 Marlowe ............................. 358/150
4,414,570 11/1983 Braune et al. ....................... 358/154
4,459,612 7/1984 Shinkai et al. ...................... 358/154

FOREIGN PATENT DOCUMENTS 2842800 4/1980 Fed. Rep. of Germany.

Primary Examiner—James J. Groody
Assistant Examiner—Michael D. Parker
Attorney, Agent, or Firm—Thomas A. Briody; William J. Streeter; Gregory P. Gadson

[57] ABSTRACT

To distinguish between the two fields in a television signal, television synchronizing pulses are applied to a pulse interval detector. The output signal of the pulse interval detector assumes a first signal state when pulse intervals are measured which are located between first and second limit values, and a second signal state when the pulse intervals are outside these limit values. The pulse interval detector is connected to a time measuring element which counts the pulse intervals of the synchronizing pulse when the first signal state is present. The time measuring element produces a field identification signal in dependence on the fact whether, for example, the first signal state is present for a longer period of time for one field than for the other field.

8 Claims, 2 Drawing Figures

CIRCUIT ARRANGEMENT FOR DISTINGUISHING BETWEEN THE TWO FIELDS IN A TELEVISION SIGNAL

BACKGROUND OF THE INVENTION

The invention relates to a circuit arrangement for distinguishing between the two fields in a television signal, comprising a detector adapted to assume a first or a second signal state in dependence on the time position of the synchronizing pulses contained in the television signal and a time measuring element connected to the detector for producing a field identification signal in dependence on the duration of one of the signal states.

Such a circuit arrangement is disclosed in German Patent Application No. 2,842,800. It generates a field identification pulse from the synchronising pulses with the aid of two series-arranged monostable trigger circuits having different time constants.

The synchronizing pulses of a television signal are usually formed from two pulse sequences which each characterize the start of a field and are located between a sequence of horizontal pulses. The two sequences comprise firstly a plurality of pre-equalizing pulses, then a plurality of field synchronising pulses and subsequently a plurality of post-equalizing pulses all the pulses occurring with a spacing half a line period. The spacing between the leading edge of the last horizontal pulse and the leading edge of the first pre-equalizing pulse and the spacing between the leading edge of the last post-equalizing pulse and the leading edge of the subsequent horizontal pulse is a whole line period for the first sequence and half a line period for the second sequence. In the European CCIR-standard five pre-equalizing pulses, picture synchronizing pulses and post-equalizing pulses are, for example produced.

In the prior art circuit arrangement a change in the output signal of the detector (the first monostable trigger circuit) occurs only then when the distance between the leading edges of two consecutive pulses exceeds a predetermined limit value. Here, this limit value must at least exceed half the line length. Consequently, a change in the output signal is only then produced after a horizontal pulse when the distance from the horizontal pulse to the subsequent pulse corresponds to one line period. During the field change this output signal is not changed, the duration of the unchanged signal depending on the field. The time measuring member (second monostable trigger circuit) produces a field identification signal after the longer duration fo the detector output signal. This field identification pulse appears after the first horizontal pulse after the last post-equalizing pulse.

SUMMARY OF THE INVENTION

The invention has for its object to provide a circuit arrangement of the type defined in the opening paragraph having such a structure that during a field the field identification signal is produced before the post-equalizing pulses are produced.

To that end, the circuit arrangement according to the invention, is characterized in that the detector is formed as a pulse interval detector for measuring the intervals between the trailing edge of a synchronizing pulse and the leading edge of a subsequent synchronizing pulse, said detector assuming its first signal state for pulse intervals located between first and second limit values and its second signal state for pulse intervals located outside these limit values.

The limit values are chosen such that the pulse intervals between the horizontal pulses are above the first limit value, the pulse intervals between the picture synchronizing pulses are below the second limit value and the pulse intervals between the equalizing pulses are within the limit values, it being a condition that for a field the pulse interval between the last horizontal pulse and the first pre-equalizing pulse is also located between the limit values. This implies for, for example, the European CCIR-standard that during one pulse sequence there are six intervals and during the other sequence there are five pulse intervals which are within the limit values. Depending on the number of pulse intervals during a pulse sequence a field identification signal is derived from the time measuring member.

In a first development of the invention it is provided that the pulse interval detector comprises a first counter for counting the periods of a clock signal, the counting procedure being started by the trailing edge of a synchronizing pulse and being stopped by the leading edge of the subsequent synchronizing pulse, the detector comprising further a register for storing the counting result. Using this structure, it is possible to distinguish the pulse intervals. To enable the detection of each pulse interval it is necessary for the period of the clock signal to have a duration shorter than the shortest pulse interval to be measured.

It should here be noted that U.S. Pat. No. 4,414,570 discloses a circuit arrangement having a counter which is enabled by a signal applied from a detector after this detector has recognized the leading edge of a synchronizing pulse produced by an A/D converter. The counter counts the periods of a clock signal and is stopped and reset, when the trailing edge of this synchronizing pulse from the detector has been recognized. The counter is so set by a programm stage that it produces only an output signal when a counting value which corresponds to the width a horizontal pulse is exceeded. The prior art circuit arrangement has for its object to identify field synchronizing signals and to derive a vertical synchronizing pulse therefrom.

The first development of the invention can now be used advantageously such that the clock frequency and the number of counter stages of the first counter are chosen such that the register only stores the content of the two most significant counter stages and that the output signals of the register are applied to a logic circuit, the output signal of the logic circuit being the output signal of the pulse interval detector. The limit values are fixed such that at an appropriate choice of the clock frequency and the number of counter stages, the two most significant counter stages produce the same output signal when pulse intervals occur between the pre-equalizing pulses, or the pulse intervals of a shorter duration occur between the trailing edge of a horizontal pulse and the leading edge of a pre-equalizing pulse. Also interferences which change the pulse interval are suppressed, as only more significant interferences produce any effect in the two most significant counter stages.

In a further development of the invention means are provided for deriving a vertical synchronizing signal from the pulse interval detector signal produced during the detection of pulse intervals which are below the first and second limit values. An inverter is provided for inverting the output signal from the least significant output of the register described above, which serves as a vertical synchronizing signal.

In accordance with a still further development of the invention it is provided that the time measuring element produces a field identification signal when the duration of the first signal state exceeds a predetermined limit value. Only when a pulse interval of a shorter duration occurs after a horizontal pulse a field identification signal is recovered after the pulse intervals between the pre-equalizing pulses have been measured.

In accordance with a further embodiment of the invention, it is provided that the time measuring member includes a second counter having a clock input for receiving a composite synchronising signal and on enable input for receiving the output signal of the pulse interval detector, and which counts only during the first signal state, a logic combining circuit being provided for producing a field indentification signal from the output signals of the counter stages of the second counter.

DESCRIPTION OF THE DRAWINGS

An embodiment of the invention will now be described in greater detail by way of example with reference to the accompanying drawing, in which:

DETAILED DESCRIPTION OF THE INVENTION

Figure 1:
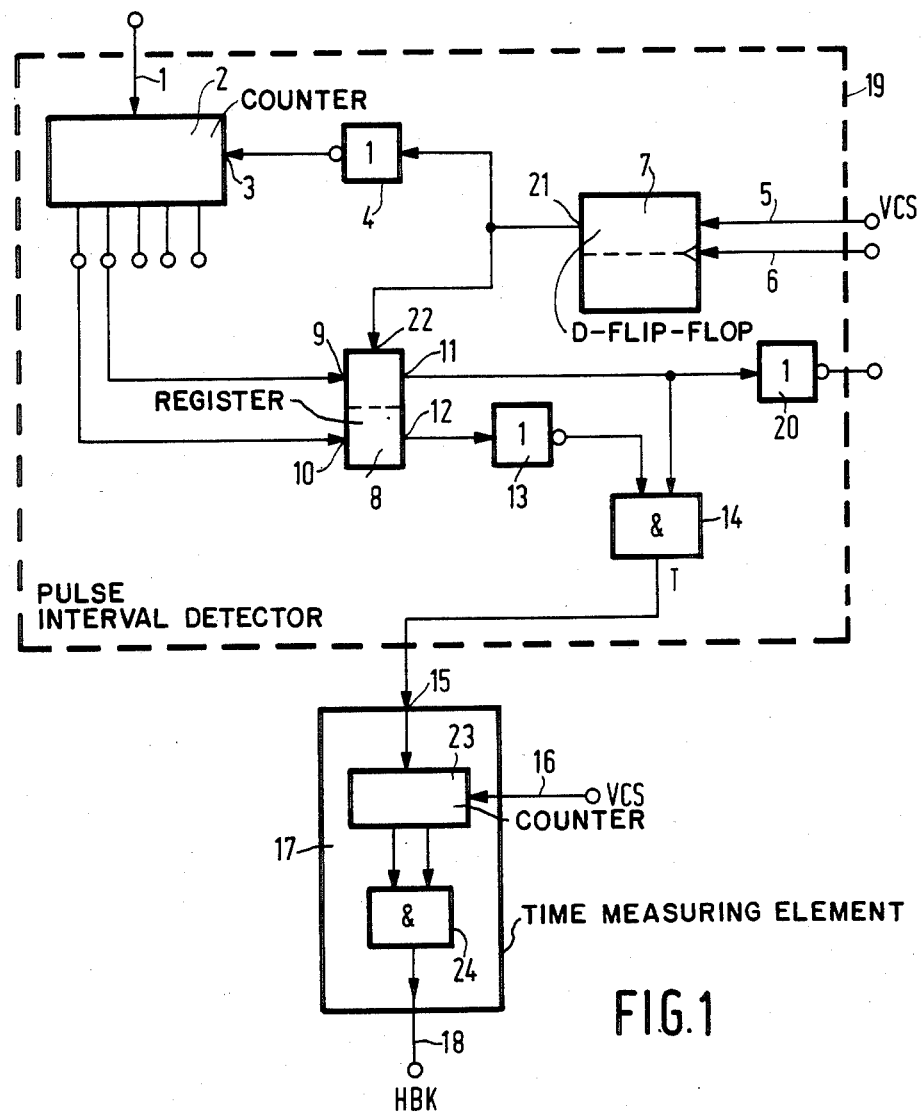

FIG. 1 shows an embodiment of the invention and

Figure 2:
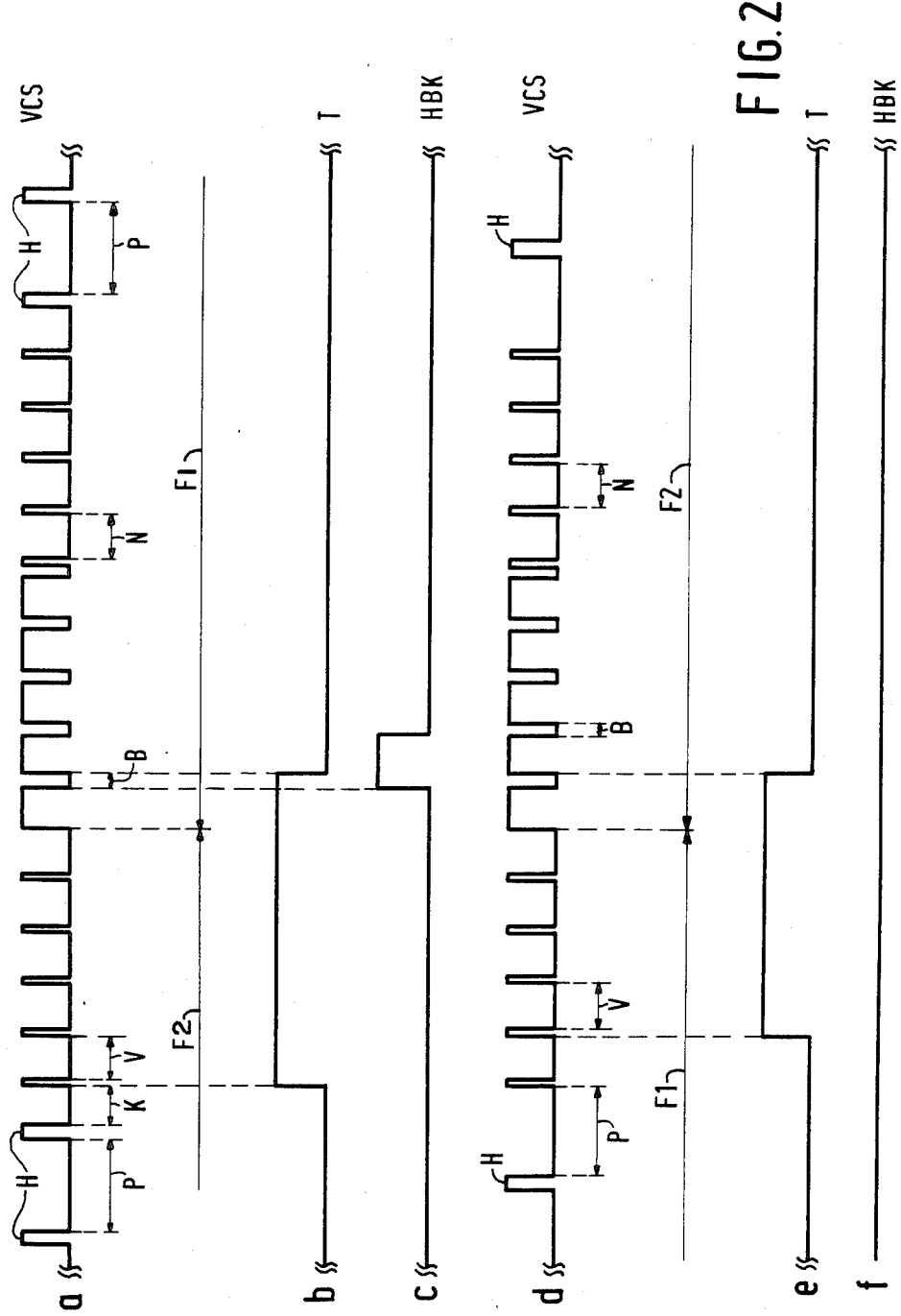

FIG. 2 shows two synchronizing pulse sequences and signals derived therefrom.

FIG. 1 shows a pulse interval detector 19 and a time measuring member 17 connected thereto. The pulse interval detector comprises a counter 2, a D-flip-flop 7, a register 8, an AND-gate 14 and three NOT-gates 4, 13 and 20. A clock signal having a frequency (counting frequency) of, for example, 0.5 MHz is applied to the clock input 1 of the counter 2. A clock signal having a frequency of, for example, 5 MHz is applied to the clock input 6 of the D-flip-flop 7, this clock signal being synchronized with the clock signal of the counter and the synchronizing pulses VCS of a television signal are applied to the D-input 5. A new synchronizing pulse does not appear at the output 21 of the D-flip-flop 7 until a leading edge of the clock signal has occurred, that is to say the beginning of each synchronizing pulse is synchronized with the clock signal. The output signal of the flip-flop 7 is applied via the NOT-gate 4 to the enable and reset input 3 of the counter 2 and to the clock input 22 of the register 8. The two most significant outputs of the counter 2 are connected to the inputs 9 and 10 of the register 8. The actual counting position is entered into the register 8 and corresponds to the leading edge of a synchronizing pulse. The lower significant bit of the counter content stored in the register 8 is applied to the AND-gate 14 via the output 11 of the register 8 and the most significant bit is applied to the AND-gate 14 via the output 12 of the register and the NOT-gate 13.

The output signal T of the pulse interval detector 19 is the output signal of the AND-gate 14 and is applied to the input 15 of the time measuring element 17. The time measuring element 17 comprises a second counter 23 and an AND-gate 24. The input 15 is an enable and reset input of the counter 23. The synchronizing pulses VCS are applied to the clock input 16 of the counter 23. Two outputs of the counter 23 are combined by the AND-gate 24. The field identification signal HBK is taken from the output 18 of the AND-gate. The time measuring element 17 counts the number of pulse intervals VCS, when an enable signal is present at the input 15.

The mode of operation of the circuit arrangement of FIG. 1 can be described in greater detail with reference to FIG. 2. In FIGS. 2a and 2d pulse sequences are shown which form part of the television synchronizing pulse in accordance with, for example, the European CCIR-standard and characterize each change of a field F1 or F2, respectively. The last horizontal pulse H is followed by five pre-equalizing pulses, five field synchronizing pulses, five post-equalizing pulses and then horizontal pulses again. The pulse interval V after a pre-equalizing pulse has a duration of 30/μus, the pulse interval B after a field synchronizing pulse has a duration of 4.7/μs, the pulse interval N after a post-equalizing pulse has a duration of 30/μs and the pulse interval P after a normal horizontal pulse H has a duration of 59/μus. A shortened pulse interval K having a duration of 27/μus occurs before the change between the second and first fields, after the last horizontal pulse H.

The inverted synchronizing pulses are applied to the input 3 of the counter 2. Via this input the counter is enabled at the beginning of a synchronizing pulse interval and is reset to zero at the end of the synchronizing pulse interval. The counter 2 is, for example, in the form of a 5 bit counter, so that, at the predetermined counting rate of 0.5 MHz it can count the largest pulse interval P, without overflow. The following binary counter results are obtained for the different pulse intervals:

Pulse interval P: 1 1 1 0 1
Pulse interval K: 0 1 1 0 1
Pulse interval V: 0 1 1 1 0
Pulse interval B: 0 0 0 1 0

The pulse intervals K and V are not different as regards the two more significant bits, but they are different from the pulse intervals P and B. The pulse interval P is above a first limit value 11000, whilst the pulse interval B is located below a second limit value 01000 and the pulse intervals K and V are between the first and second limit values. This is utilized to identify the two fields. Therefore the register 8 stores only the two more significant bits. By combining in the AND-gate 14 the lower significant bit of the register 8 and the more significant bit inverted in the NOT-gate 13, the output signal T of the AND-gate 14 changes from a second signal state to a, for example, more positive first signal state, when the combination 0 1 is stored in the register.

The register 8 stores the counting result at the beginning of each synchronizing pulse leading edge and consequently keeps the signal T between the pulses constant. The NOT-gate 14 also produces a delay, so that first the counting result is transferred to the register 8 and thereafter the counter 2 is reset. If a pulse interval other than K and V is measured, the signal returns to the second signal state. In FIG. 2b, because of the pulse interval K, the signal T occurs at an earlier instant and is half a line longer in the first signal state than in FIG. 2e. As only the two most significant bits of the counter 2 are utilized to produce the signals T, the circuit arrangement remains immune to interference in the case of smaller deviations of the pulse intervals and in the case of fluctuations in the counting rate.

In the embodiment shown here, the number of counting stages of the counter 2 has been chosen such that in none of the pulse interval measurements overflow occurs. However, when the counting rate is chosen appropriately, the number of counting stages, for example 0.75 MHz for 5 counting stages, can be dimensioned such that, for example during the duration of the pulse interval P, overflow occurs. Then the circuit can alternatively be structured such that only the most significant bit is stored and applied without a logic circuit directly to the input 15 of the time measuring element 17.

If the signal T changes from the second signal state to the first signal state, the counter 23 incorporated in time measuring element 17 is enabled and counts the pulse intervals of the synchronizing pulses. When the counter has counted six pulse intervals, a field identification signal is applied via the AND-gate 24. If the signal T changes from the first signal state into the second signal state, then the counter 23 in the time measuring element 17 is inhibited and reset. During the change from the first to the second field no field identification signal can consequently be produced, as the time measuring element 17 counts only five pulse intervals. The field identification signal is shown in Figs. 2c and 2f.

In addition to the field identification signal a vertical synchronizing signal can also be produced by this circuit arrangement. The lower significant bit of the counting result stored in the register 8 is only zero after the pulse interval B has been measured. As this result only occurs after measurement of the field synchronizing pulse the inverted output signal from the output 11 of the register 8 corresponds to a vertical synchronizing signal. Therefore the output 11 of the register 8 is connected to a NOT-gate 20. The output signal of the gate 20 is consequently the vertical synchronizing signal.

What is claimed is:

1. A circuit arrangement for distinguishing between two fields in a television signal, comprising a detector adapted to assume a first or a second signal state in dependence on the time position of synchronizing pulses contained in the television signal, and a time measuring element connected to the detector for producing a field identification signal in dependence on the duration of one of the signal states, characterized in that the detector is formed as a pulse interval detector for measuring the intervals between the trailing edge of each of said synchronizing pulses and the leading edge of subsequent synchronizing pulses, said detector assuming its first signal state, for pulse intervals located between first and second limit values and its second signal state for pulse intervals located outside these limits values.

2. A circuit arrangement as claimed in claim 1, characterized in that the pulse interval detector comprises a first counter for counting the periods of a clock signal, the counting being started by the trailing edge of each of said synchronizing pulses and being stopped by the leading edge of the subsequent synchronizing pulses, the detector comprising further a register for storing the number of clock signal periods counted by the first counter.

3. A circuit arrangement as claimed in claim 2, characterized in that the clock frequency and a number of counter stages of the first counter are chosen such that the register only stores the content of the two most significant counter stages and that output signals of the register are applied to a logic circuit, an output signal of the logic circuit being one of the signal states of the pulse interval detector.

4. A circuit arrangement as claimed in claim 1, characterized by means for deriving a vertical synchronizing signal from a pulse interval detector signal produced during the detection of pulse intervals which are below the first and second limit values.

5. A circuit arrangement as claimed in claims 3 or characterized by an inverter for inverting the output signal from the lower significant output of the register, which serves as a vertical synchronizing signal.

6. A circuit arrangement as claimed in claim 2, characterized in that a number of counter stages of the first counter are chosen, the number being at least so large that the counter measures a line trace period without overflow.

7. A circuit arrangement as claimed in claim 1, characterized in that the time measuring element produces said field identification signal when the duration of the first signal state exceeds a predetermined limit value.

8. A circuit arrangement as claimed in claim 1, characterized in that the time measuring element includes a counter having a clock input for receiving a said synchronizing pulses and an enable input for receiving an output signal of the pulse interval detector and which counts only during the first signal state, a logic combining circuit being provided for producing said field identification signal from an output signal of the counter.

* * * * *